United States Patent [19]

Swinehart et al.

[11] Patent Number: 4,895,307
[45] Date of Patent: Jan. 23, 1990

[54] ROTARY SPRAY DEVICE

[75] Inventors: Lonn L. Swinehart; Daniel A. Kutt, both of N. Canton, Ohio

[73] Assignee: Washtronics, Inc., North Canton, Ohio

[21] Appl. No.: 221,342

[22] Filed: Jul. 19, 1988

[51] Int. Cl.$^4$ .............................................. B05B 3/12
[52] U.S. Cl. ................................. 239/263; 239/263.1; 239/263.3; 239/264; 134/181; 134/188
[58] Field of Search ............... 239/263.1, 263.2, 263.3, 239/263, 264, 240, 248, 249, 259, 210, 380, 225.1, 239; 134/180, 181, 188

[56] References Cited

U.S. PATENT DOCUMENTS

| | | | |
|---|---|---|---|
| 1,111,7324 | 9/1914 | Campbell | 239/239 |
| 1,317,540 | 9/1919 | Bavor | 239/275 |
| 1,755,455 | 4/1930 | Nelson | 239/239 |
| 2,392,540 | 1/1946 | Lyman | 134/180 X |
| 3,625,425 | 12/1971 | Robinson | 239/227 |
| 3,688,784 | 9/1972 | Daum | 134/181 X |
| 3,698,029 | 10/1972 | Pulliam | 134/180 X |
| 3,987,963 | 10/1976 | Pacht | 239/240 X |
| 4,651,925 | 3/1987 | Harris | 239/239 |
| 4,690,325 | 9/1987 | Pacht | 239/263.1 X |
| 4,761,039 | 8/1988 | Hilaris | 239/263.3 X |

FOREIGN PATENT DOCUMENTS 660119  10/1951  United Kingdom .

Primary Examiner—Robert J. Oberleitner
Assistant Examiner—Karen B. Merritt
Attorney, Agent, or Firm—Michael Sand Co.

[57] ABSTRACT

A spray device having a plurality of rotating nozzles directs narrow streams of a high pressure fluid in a circular pattern against a vehicle being cleaned in a car wash installation. A conduit for supplying the high pressure fluid to the nozzles is rotatably mounted within a lower generally watertight housing. A front end of the fluid supply conduit extends outwardly of the housing, and a rear end of the conduit is connected to a source of the high pressure fluid by a rotary union. The nozzles are mounted on the ends of T-shaped fluid supply tubes which extend radially outwardly from the extended front end of the supply pipe. A motor is mounted within a generally waterproof upper housing which is mounted on the lower housing and is generally isolated therefrom. The supply conduit is rotated by the motor which is connected thereto by an endless drive belt which extends through a small opening which provides communication between the two housings. Mounting of the motor in the upper housing shields the motor from the high pressure spray fluid and possible fluid leaks, yet allows heat from the motor to be dissipated by the housing walls into the ambient air to prevent overheating of the motor.

17 Claims, 3 Drawing Sheets

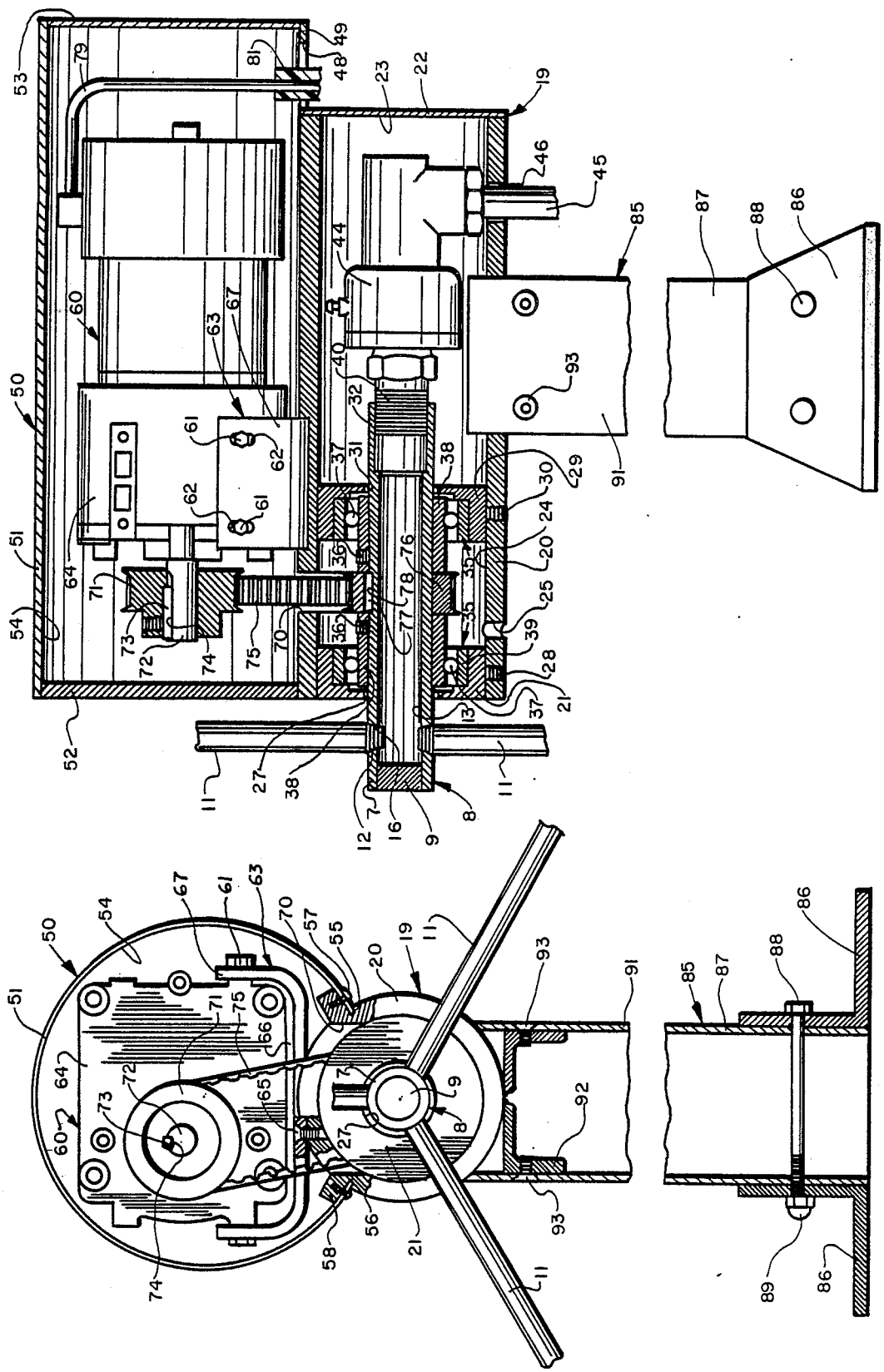

ROTARY SPRAY DEVICE

TECHNICAL FIELD

The invention relates to devices for spraying high pressure fluid onto an object through a plurality of rotating spray nozzles, and in particular to a device for spraying the fluid onto a vehicle in a car wash installation. More particularly, the invention relates to such a rotary spray device in which the motor for rotating the nozzles is shielded from the high pressure spray fluid without causing the motor to overheat.

BACKGROUND ART

Various types, styles and arrangements of spray nozzles are used in vehicle washing installations for supplying a high pressure water spray containing various chemical compounds against surfaces of the vehicle to clean the vehicle as it moves past the nozzles or as the nozzles are moved with respect to the vehicle. These spray nozzles may be fixed and directed in a predetermined direction for spraying specific generally constant surfaces of a vehicle such as the sides, hoods or roof and achieve a generally satisfactory result. However, certain areas of a vehicle such as the rocker panels, wheels and other irregular surfaces are difficult to satisfactorily clean by fixed nozzles and spray pattern due to the different surface configurations of such rocker panels and wheels for the various vehicles processed in a car wash facility.

One method and device for efficiently cleaning these irregular vehicle surfaces is to use a movable nozzle such as an oscillator or rotary nozzle. These nozzles will increase the area covered by the spray so that it will reach the irregular surfaces and effectively clean the same. Prior rotary nozzles consist of a plurality of spray nozzles directed at various angles toward the vehicle surface which are rotated by a pneumatic motor, electric motor, hydraulic motor, or the like. Use of such motors for supplying the rotary power to the nozzles require components and control equipment such as electric or pneumatic solenoids, a supply of electricity or hydraulic fluid and control valves therefor. These components are subject to increased maintenence and associated increased cost to operate due to the harsh environment of the car wash installation in which these additional components operate.

A common maintenence problem encountered in motors, and especially in electric motors, is failure of the motor due to exposure to moisture. The motor of a rotary spray device in a car wash installation typically is exposed to such moisture in the form of the high pressure fluid sprayed from the nozzles or a fluid leak in another component of the spray device. Furthermore, during high traffic periods the motor of the device runs continuously for extended time periods. Such continuous running of the motor can cause excessive heat buildup therein leading to motor failure if an effective cooling system is not provided for the motor.

These facts pose a dilemma to anyone attempting to use certain motors to power rotary spray nozzles in a car wash facility. That is, in order to protect the motor from the high pressure spray fluid it must be mounted in a generally liquid-tight housing which shields the motor from the spray fluid. However, such housings prevent heat generated by the motor from escaping causing overheating of the motor. Mounting the motor in a manner which exposes it to the ambient air in the car wash installation will cool the motor, but also exposes it to the fluid spray which can cause maintainence problems such as a short circuit in an electrical motor.

Therefore, the need has existed for a rotary spray device in which the motor for supplying the rotary power to the spray nozzles is mounted in such a manner as to protect the motor from the high pressure spray fluid without causing overheating of the motor or requiring a separate cooling system therefor. There is no known rotary spray device of which we are aware which accomplishes this result other than our invention described in detail below.

DISCLOSURE OF THE INVENTION

Objectives of the invention include providing an improved rotary spray device for spraying high pressure fluid onto a vehicle in which the motor for rotating the spray nozzles is mounted in such a manner as to shield the motor from the fluid sprayed from the rotating nozzles or deflected from the vehicle being cleaned, as well as from other fluids being sprayed onto the vehicle in the car wash bay by other spray devices.

Another objective is to provide such an improved spray device in which the motor is shielded from any high pressure fluid leaks which develop in the spray device since it is mounted in a separate generally waterproof compartment or housing above the housing in which the fluid supply components are located.

A further objective of the invention is to provide such an improved rotary spray device in which the motor is shielded from high pressure spray fluids without causing overheating of the motor or requiring installation of an auxiliary cooling system therefor, since the housing walls which form the separate compartment in which the motor is located are formed of metal and act as a heat sink for dissipating any heat; and in which the housing walls are cooled by the fluid being sprayed on the vehicle.

Still another objective of the invention is to provide such an improved rotary spray device which is adapted to utilize different types, styles and sizes of motors for rotating the spray nozzles, and in which the device is further adapted for quick and easy mounting of such different motors on the device.

Another objective of the invention is to provide such an improved rotary spray device in which the motor compartment is completely separated from the fluid supply compartment.

A still further objective of the invention is to provide such an improved rotary spray device which is economical to manufacture, rugged and durable in use, easy to install and maintain, and which satisfactorily and efficiently cleans the surfaces of a vehicle in a car wash installation by spraying the fluid in a plurality of narrow streams onto the surfaces in circular patterns.

A further objective of the invention is to provide such an improved rotary spray device in which the narrow fluid spray streams impact the vehicle surface to be cleaned with substantially the same cleaning force regardless of the distance within the wash bay of the vehicle surface from the spray nozzles.

These objectives and advantages are obtained by the improved rotary spray device of the invention, the general nature of which may be stated as including, a generally waterproof first housing; a generally waterproof second housing mounted on and above the first housing; conduit means rotatably mounted within the first housing and adapted to be connected to a source of high pressure fluid and having an end extending outwardly of the first housing; nozzle means attached to the extended end of the conduit means for spraying the high pressure fluid against a surface to be cleaned; and motor means mounted within the second housing and operatively connected to the conduit means for rotating the conduit means and attached nozzle means.

BRIEF DESCRIPTION OF THE DRAWINGS

Preferred embodiments, illustrative of the best modes in which applicants have contemplated applying the principles, are set forth in the following description and are shown in the drawings and are particularly and distinctly pointed out and set forth in the appended claims.

FIG. 3 is an enlarged fragmentary front elevational view, with portions broken away and in section, of the spray device of FIG. 1;

FIG. 4 is a fragmentary right-hand elevational view, with portions in section, of the spray device of FIG. 3;

Similar numerals refer to similar parts throughout the drawings.

BEST MODE FOR CARRYING OUT THE INVENTION

Figure 1:
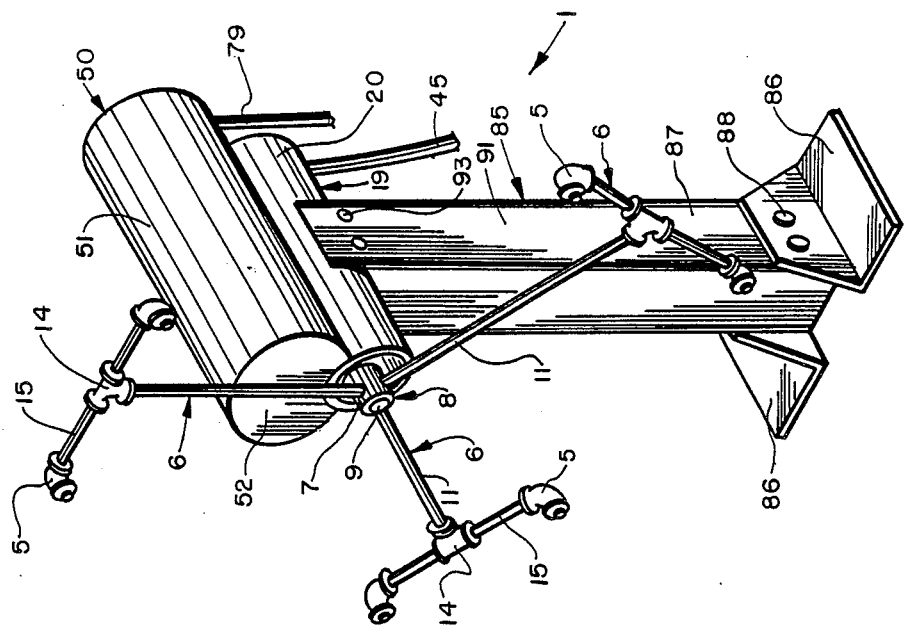
FIG. 1 is a perspective view of the rotary spray device of the present invention.

The improved rotary spray device is indicated generally at 1, and is shown in FIG. 1. Although intended for use in spraying various surfaces of a vehicle, and especially irregular vehicle surfaces which are difficult to clean using prior fixed spray nozzles, device 1 can be used for other spray applications than in a car wash installation, and is effective for applying a high pressure spray pattern of liquid or fluid against other types of objects.

Device 1 includes a plurality of spray nozzles 5 which are mounted on the extended ends of T-shaped fluid supply tubes 6 which extend radially outwardly from an extended end 7 of a fluid supply pipe or conduit 8 (FIG. 1). Extended end 7 of conduit 8 has a plug 9 mounted therein by a force fit and welding to prevent the escape of fluid. T-shaped tubes 6 each includes an elongated tube 11 having a threaded end 12 (FIG. 4) which is threadably engaged in a threaded hole 16 formed in extended end 7 to enable tube 11 to communicate with a fluid passageway 13 formed by the hollow bore of conduit 8. A T-connector 14 is mounted on the extended end of elongated tube 11 for connecting a pair of terminal tubes 15 thereto. Terminal tubes 15 are connected perpendicularly to tube 11 and each have one of the spray nozzles 5 mounted on its outer end.

Fluid supply conduit 8 is rotatably mounted within a first or lower generally watertight housing indicated generally at 19 (FIGS. 1 and 4). Housing 19 includes a cylindrical-shaped, elongated sidewall 20 having a front enclosure cover plate provided by a bearing holder 21 and a rear cover plate 22.

Front bearing holder 21 has an aperture 27 (FIGS. 3 and 4) formed therein for receiving extended end 7 of the fluid supply conduit, and is mounted within and secured to sidewall 20 by a set screw 28. Rear cover plate 22 is attached to sidewall 20 by any suitable attachment means. A rear bearing holder 29 is mounted within housing 19 in spaced relationship and in a similar manner to front bearing holder 21 by a set screw 30 and forms an intermediate partition wall for housing 19. An aperture 31 is formed in rear bearing holder 29 for receiving an opposite end 32 of fluid supply conduit 8.

Rear bearing holder 29, cover plate 22 and sidewall 20 form a generally splash-proof first or rear compartment 23 of housing 19. Front bearing holder 21, bearing holder 29 and sidewall 20 form a generally splash-proof second or front compartment 24 of housing 19. A drainhole 25 is formed in a bottom portion of sidewall 20 for draining any fluid or other liquid which could accumulate in second compartment 24.

A sealed ball bearing 35 is mounted within each of the spaced bearing holders 21 and 29 by suitable means such as press-fitting. Each bearing 35 includes a plurality of rollers 37, an inner race 38 and an outer race 39. Each bearing 35 also is mounted on fluid supply conduit 8 by a set screw 36 which passes through and threadably engages inner race 38 of the bearing, and engages the conduit.

Fluid supply conduit 8 is rotatably connected to a stationary freely suspended rotary union 44 by threaded engagement with a nipple 40 (FIG. 4). A fluid supply line 45, which is connected to a suitable source of high pressure liquid (not shown), passes through an opening 46 formed in sidewall 20 of the first housing and is connected to the rotary union by a pipe thread. Thus, fluid passageway 13 of the fluid supply conduit communicates with fluid supply line 45 through the rotary union. Opening 46 also provides for draining any fluid or other liquid which could accumulate in first compartment 23 of lower housing 19 from a leak in the rotary union connections or other source.

A second or upper generally watertight housing 50 (FIGS. 1, 3 and 4) is formed by an arcuate, somewhat cylindrical, elongated sidewall 51 having front and rear cover plates 52 and 53, respectively. Each of the cover plates is attached to a respective end of sidewall 51 by any suitable attachment means for generally defining and enclosing an upper interior compartment 54.

Upper housing 50 is mounted on and above the lower housing by the slideable engagement of a pair of longitudinally extending edges 55 of sidewall 51 in a corresponding pair of longitudinally extending slots 56 formed in an upper portion of sidewall 20 of lower housing 19, as is best shown in FIG. 3. The upper housing is secured on the lower housing by a pair of bolts 57 which pass through upper housing sidewall 51 and threadably engage a pair of spaced brackets 57 attached to the outer surface of lower housing sidewall 20. Upper housing 50 has a greater length than that of the lower housing, so that the rear end of the upper housing extends rearwardly beyond rear cover plate 22 of the lower housing. To maintain the generally watertight character of the upper housing, a rear portion 49 (FIG. 4) encloses that portion of sidewall 51 which overhangs the lower housing. An opening 48 is formed in rear portion 49 and functions as a vent to enable ambient air of the car wash facility to pass into interior compartment 54 of the upper housing for assisting in cooling an electric motor 60 mounted therein, as described below.

Electric motor 60 is mounted within upper housing 50 (FIGS. 3 and 4) by a plurality of bolts 61 which pass through corresponding openings 62 formed in the sidewalls 67 of a U-shaped bracket 63 and threadably engage the motor housing 64. The U-shaped bracket is secured within the upper housing by a plurality of bolts 65 which pass through a web wall 66 of the bracket and threadably engage lower housing sidewall 20.

A first pulley 71 is mounted on an output shaft 72 of electric motor 60 by engagement of a key 73 formed on the pulley with a keyway 74 formed in the shaft. A slot or opening 70 is formed in lower housing sidewall 20 whereby second lower housing compartment 24 communicates with upper housing compartment 54. An endless drive belt 75 passes through slot 70 and drivingly connects and extends between the first pulley and a second pulley 76 which is mounted on fluid supply conduit 8 by engagement of a key 77 formed on the second pulley with a keyway 78 formed in the conduit. Electric motor 60 is connected to a source of electricity by a power line 79 which passes through a casing 81 mounted in opening 48 of rear portion 49 of the upper housing. Casing 81 preferably is formed of a dielectric material such as rubber or the like.

The spray device includes a base post 85 (FIGS. 1 and 3) which is adapted to be installed either in a fixed or movable position along the path of a vehicle that is moved through a car wash installation by a conveyer in a manner well known in the art. Post 85 also can be mounted in a car wash facility of the type wherein the car maintains a fixed position in a wash bay and various other cleaning nozzles and brushes are moved around the stationary vehicle.

Base post 85 (FIGS. 1 and 3) elevates the operating components of the spray device a sufficient distance above the ground to provide clearance for the rotation of the radially extending fluid supply tubes and attached spray nozzles. A pair of generally L-shaped feet 86 are mounted on opposite sides of a lower end 87 of the base post by a pair of bolts 88 which pass through the opposite sides. The feet are secured on the base post by a pair of acorn nuts 89 which are threadably engaged with the bolts. The feet in turn are secured to the ground in a suitable manner such as by floor anchors or other usual fastening means.

Lower housing 19 nests in and is mounted on an upper end 91 of base post 85 by a pair of brackets 92 (FIG. 3) which are each welded to a bottom portion of lower housing sidewall 20. Each bracket 92 is mounted within the upper end and on opposite sides of the base post by a plurality of bolts 93 which pass through the post and threadably engage the brackets.

A brief description of the operation of the rotary spray device of the present invention is set forth below. The electric motor is connected to the electric power source by power line 79 and the motor is started in a usual manner. Output shaft 72 of motor 60 rotates supply conduit 8 through first pulley 71, second pulley 76 and connecting drive belt 75. High pressure fluid passes through fluid supply line 45, rotary union 44 and rotating fluid supply conduit 8, and then into tubes 11 and out of nozzles 5 in narrow streams and in a generally perpendicular direction against the vehicle surface being cleaned. This rotary motion of the spray nozzles provides for complete coverage of the surface being cleaned by spraying the fluid in a circular pattern against the vehicle surface. Moreover, the narrow fluid spray streams and generally perpendicular impact of those streams against the vehicle surface being cleaned provide a greater fluid cleaning force on the surface than achieved by many prior art car wash spray devices.

In accordance with one of the main features of the invention, upper housing 50 is generally watertight to shield the electric motor from the fluid spray from the nozzles, deflected fluid spray from the surface being cleaned, or from fluid spray from other spray devices in the wash bay. Furthermore, the mounting of the electric motor in the upper housing compartment remote from the connections of the rotary union with the fluid supply pipe and the fluid supply line, eliminates or substantially reduces the possibility of high pressure fluid from a leak in one of these connections spraying onto the motor and causing a short circuit or other maintenence problems. Generally splash-proof second lower housing compartment 24 provides a buffer between first lower housing compartment 23, where a possible leak in one of the rotary union connections will occur, and upper housing compartment 54. Thus, fluid from a leak in one of the rotary connections is prevented from passing through slot 70, into the upper housing compartment, and spraying onto the electric motor mounted therein. It is desirable to limit the amount of such maintenance problems encountered with equipment in a car wash facility, since equipment failure reduces the cleaning capability of the facility and can even cause a complete shutdown of the business resulting in reduced profits.

In addition, the upper housing 50 preferably is formed of a thin, yet rugged aluminum material, which provides for exchange of heat from the electric motor through the sidewall and cover plates of the housing, and into the ambient air of the car wash installation to maintain the normal operating temperature of the motor without requiring a separate cooling system therefor. Moreover, water droplets from the wash bay environment, which continually come into contact with the outer surface of the housing, also aid in the heat transfer process by evaporating from this surface causing cooling of the housing. The air within the housing in turn is cooled by heat transfer to the cool housing. Also, opening 48 formed in the upper housing enables cool ambient air from the wash bay environment to enter the housing which further aids in dissipation of heat from the motor.

Figure 2:
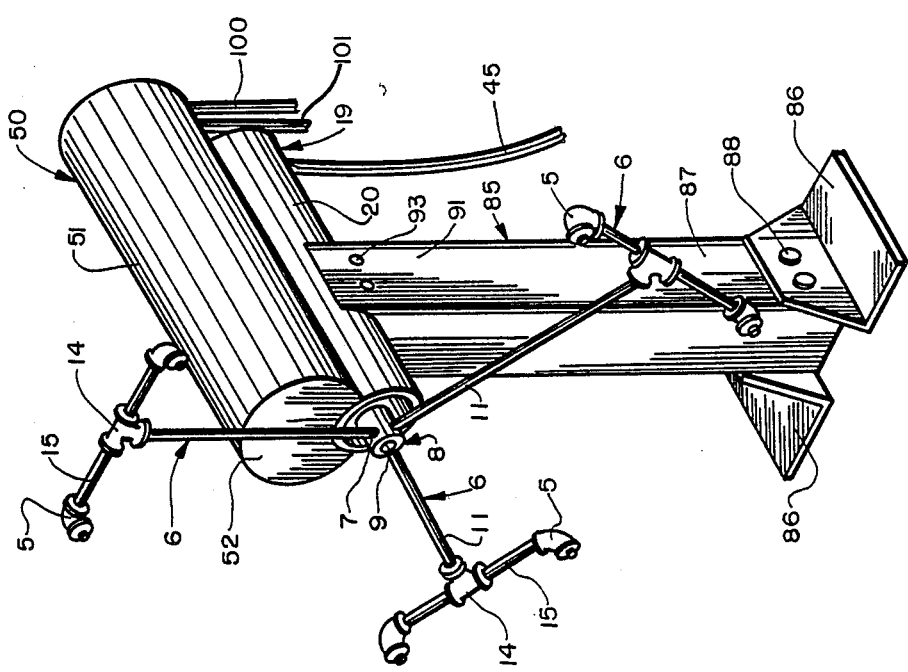
FIG. 2 is a perspective view of a second embodiment of the improved rotary spray device.
Figure 6:
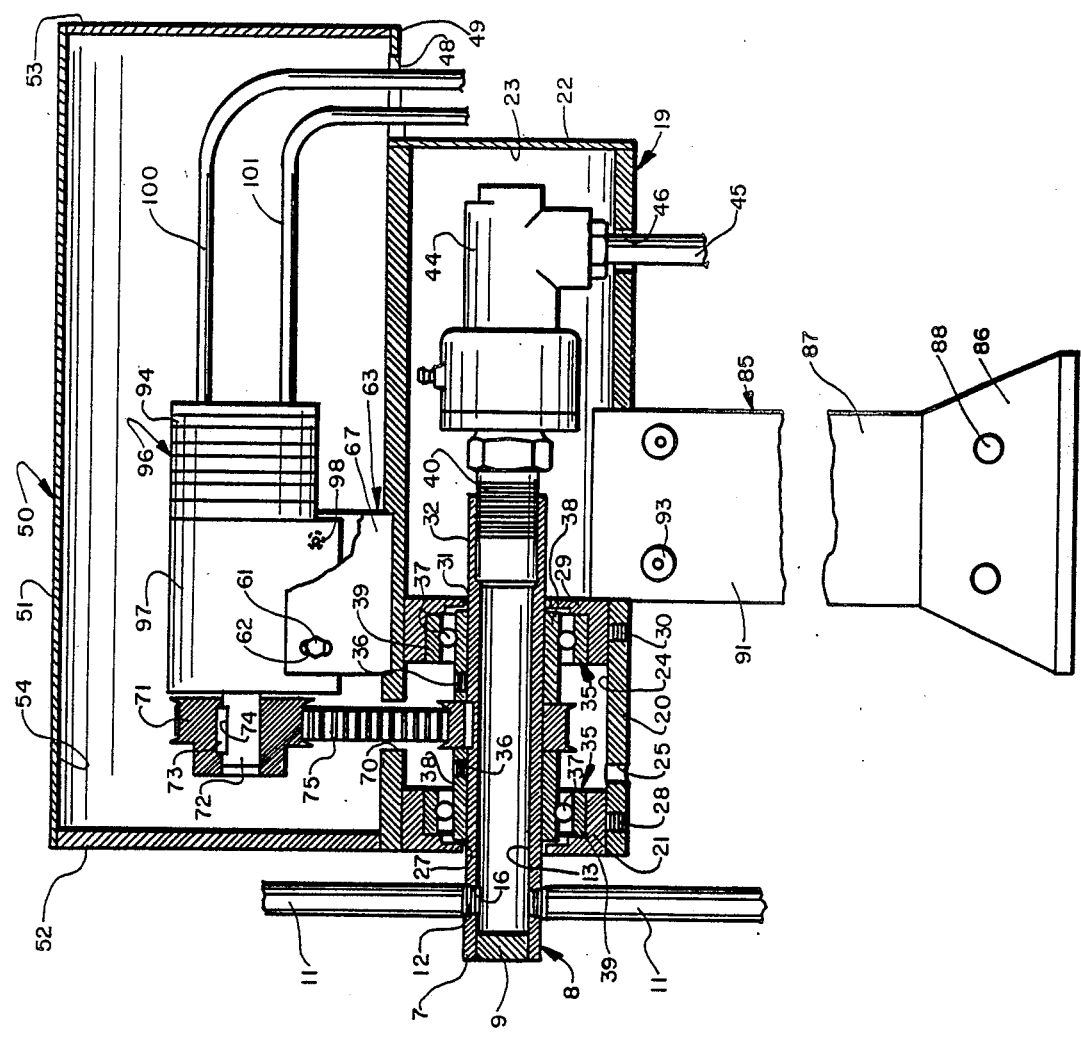
FIG. 6 is a fragmentary right-hand elevational view, with portions in section, of the spray device of FIG. 5.
Figure 5:
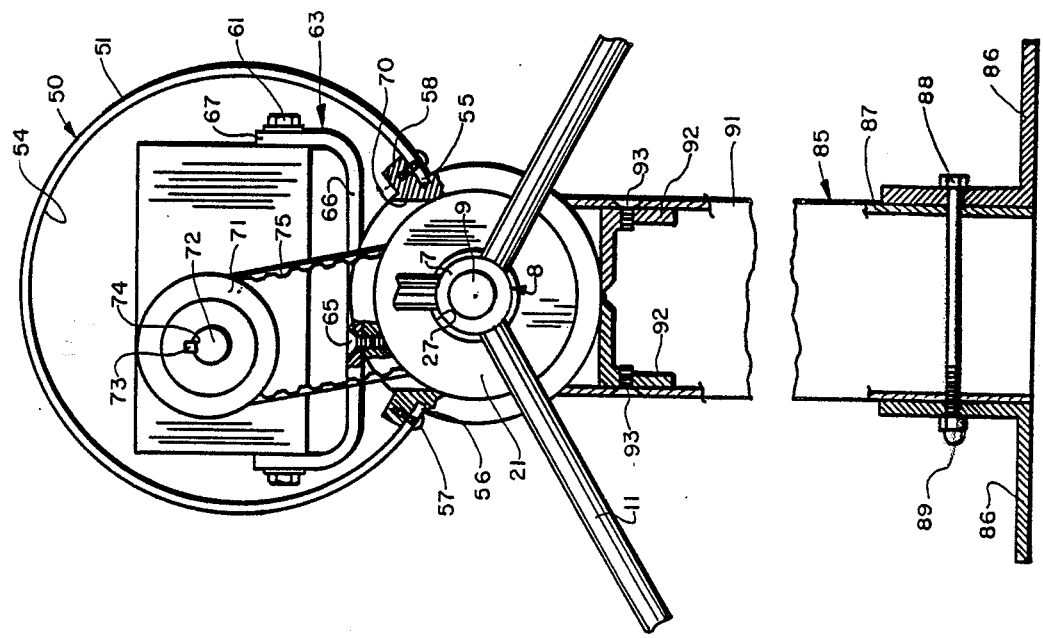
FIG. 5 is an enlarged fragmentary front elevational view, with portions broken away and in section, of the second embodiment of the spray device of FIG. 2.

A second embodiment of the improved rotary spray device is indicated generally at 95, and is shown in FIG. 2. Device 95 is similar to device 1 except for certain differences, some of which are set forth below. A hydraulic motor 96 rather than an electric motor, is used to rotate the spray nozzles (FIGS. 5 and 6). A U-shaped adapter bracket 97 is attached to the hydraulic motor by suitable means for mounting motor 96 on U-shaped mounting bracket 63. Bolts 61 pass through openings 62 formed in sidewalls 67 of bracket 63, through aligned holes 98 formed in adapter bracket 97, and threadably engage motor housing 94. Adapter bracket 97 provides for mounting motors of different sizes, types and styles than the hydraulic motor described herein. A pair of hydraulic fluid lines 100 and 101 of motor 96 pass through opening 48 of upper housing 50 and are connected to a source of hydraulic fluid (not shown) for providing the fluid to the motor.

Although the above-described embodiments of the improved rotary spray device show an electric and hydraulic motor as the preferred means for rotating the fluid supply conduit and the attached tubes and spray nozzles, other types and styles of motors, such as a pneumatic motor, could be employed for this purpose.

Moreover, it is desirable that the nozzles emit their narrow fluid spray streams generally perpendicularly against the surface being cleaned, or parallel to their axis of rotation to achieve the most efficient cleaning result. If desired, for certain applications the angle of spray can be modified from the perpendicular direction without effecting the concept of the invention. However, the perpendicular spray direction is preferred in order to achieve the full impact of the high pressure liquid spray against the surface being cleaned.

In summary, the mounting of the motor for rotating the spray nozzles above and generally separate from the fluid supply components of the spray device, shields the motor from the sprayed fluids in the car wash bay and from high pressure fluid leaks which can develop in those supply components causing motor malfunction. Moreover, by mounting the motor within an upper housing above the fluid supply components, the upper housing walls are fully exposed to the ambient air and are located so that water droplets from the wash bay environment will contact the outer surface of the walls and evaporate to aid in the dissipation of heat from the motor. Such an "over and under" arrangement thus eliminates the need for an auxiliary cooling system for the motor. Also, the drive motor for rotating the fluid supply conduit is directly connected to the conduit by an endless belt to provide a simple yet highly efficient transfer of power.

Accordingly, the improved rotary spray device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved rotary spray device is constructed and used, the characteristics of the construction, and the advantageous, new and useful results obtained; the new and useful structures, devices, elements, arrangements, parts, and combinations, are set forth in the appended claims.

What is claimed is:

1. A rotary spray device including:
   (a) a lower housing;
   (b) an upper housing mounted on and above the lower housing and generally isolated therefrom;
   (c) a fluid supply conduit rotatably mounted within the lower housing and adapted to be connected to a source of high pressure fluid;
   (d) nozzle means attached to the fluid supply conduit for spraying the high pressure fluid against a surface to be cleaned; and
   (e) motor means mounted within the upper housing and operatively connected to the fluid supply conduit by a drive belt for rotating said conduit and attached nozzle means, said drive belt passing through an opening formed between the upper and lower housings.

2. The device defined in claim 1 in which the lower housing includes a cylindrical-shaped, elongated sidewall and front and rear end plates; in which an intermediate wall is mounted within said sidewall in spaced relationship from said end plates; and in which the extended end of the conduit means extends through an aperture formed in the front plate.

3. The device defined in claim 2 in which the intermediate wall, rear plate and sidewall define and form a first compartment; in which the intermediate wall, front plate and sidewall form a second compartment; and in which the front plate and intermediate wall each include a bearing mounted in a bearing holder.

4. The device defined in claim 3 in which the upper housing includes the generally cylindrical-shaped, elongated sidewall and front and back cover plates attached to ends of said sidewall and form an upper compartment; and in which said upper compartment communicates with the second compartment through a slot formed in the lower housing sidewall.

5. The device defined in claim 4 in which the motor means is an electric motor having an output shaft; in which the conduit means includes a hollow conduit; in which a first pulley is mounted on said output shaft and a second pulley is mounted on the conduit in the second compartment; and in which an endless drive belt passes through the slot of the first housing sidewall and drivingly connects and extends between said first and second pulleys for rotating the conduit.

6. The device defined in claim 3 in which the conduit means is a supply conduit and is adapted to be connected to the source of high pressure fluid by a rotary union.

7. The device defined in claim 6 in which the rotary union is freely suspended on an end of the supply conduit in the first compartment.

8. The device defined in claim 6 in which the supply conduit is rotatably mounted within the first housing on bearings mounted in bearing holders on the spaced front plate and intermediate wall.

9. The device defined in claim 1 in which the nozzle means includes a plurality of spray nozzles mounted on ends of fluid supply tubes extending radially outwardly from the extended end of the conduit means.

10. The device defined in claim 1 in which the upper housing is formed of metal which provides a heat sink for dissipating heat generated by the motor means mounted within said upper housing; and in which an opening formed in the upper housing provides a vent for heat generated by the motor means.

11. The device defined in claim 1 in which the upper housing is formed generally of aluminum.

12. The device defined in claim 1 in which the motor means is a hydraulic motor.

13. The device defined in claim 1 in which the lower housing is supported in an elevated position by a base post.

14. A rotary spray device including:
   (a) a generally waterproof first housing having a generally cylindrical-shaped wall formed with a pair of elongated slots;
   (b) a generally waterproof second housing mounted on and above the first housing, said second housing having an arcuate-shaped wall terminating in a pair of end edges, with said end edges being slideably received within the first housing wall slots for mounting the second housing on said first housing;
(c) conduit means rotatably mounted within the first housing and adapted to be connected to a source of high pressure fluid and having an end extending outwardly of said first housing;
(d) nozzle means attached to the extended end of the conduit means for spraying the high pressure fluid against a surface to be cleaned; and
(e) motor means mounted within the second housing and operatively connected to the conduit means for rotating the conduit means and attached nozzle means.

15. A rotary spray device including:
(a) a generally waterproof first housing having front and rear compartments;
(b) a generally waterproof second housing mounted on and above the first housing forming an upper compartment;
(c) a fluid supply conduit rotatably mounted within the first housing and adapted to be connected in the rear compartment to a source of high pressure fluid;
(d) nozzle means attached to the fluid supply conduit for spraying the high pressure fluid against a surface;
(e) motor means mounted within the second housing and operatively connected to the fluid supply conduit by a drive belt for rotating said conduit and attached nozzle means, said drive belt passing through an opening formed between the upper compartment of the second housing and the front compartment of the first housing.

16. A rotary spray device including:
(a) a generally waterproof first housing having a cylindrical-shaped, elongated sidewall and front and rear end plates, and an intermediate wall mounted within said sidewall in spaced relationship from said end plates, said intermediate wall, rear plate and sidewall defining and forming a first compartment, with said intermediate wall, front plate and sidewall forming a second compartment;
(b) a bearing mounted in a bearing holder in the front plate and intermediate wall;
(c) a generally waterproof second housing mounted on and above the first housing;
(d) conduit means rotatably mounted within the first housing and adapted to be connected to a source of high pressure fluid and having an end extending outwardly through an aperture formed in the front plate of said first housing;
(e) nozzle means attached to the extended end of the conduit means for spraying the high pressure fluid against a surface to be cleaned; and
(f) motor means mounted within the second housing and operatively connected to the conduit means for rotating the conduit means and attached nozzle means.

17. A rotary spray device including:
(a) a first housing;
(b) a second housing mounted on the first housing;
(c) a fluid supply conduit rotatably mounted within the first housing and adapted to be connected to a source of high pressure fluid;
(d) nozzle means attached to the fluid supply conduit for spraying the high pressure fluid against a surface to be cleaned; and
(e) motor means mounted within the second housing and operatively connected to the fluid supply conduit by a drive belt for rotating said conduit and attached nozzle means, said drive belt passing through an opening formed between the first and second housings.

* * * * *